March 12, 1968 D. SATAS 3,372,980
RECYCLIZATION OF ETHYLENE OXIDE
Filed July 5, 1963
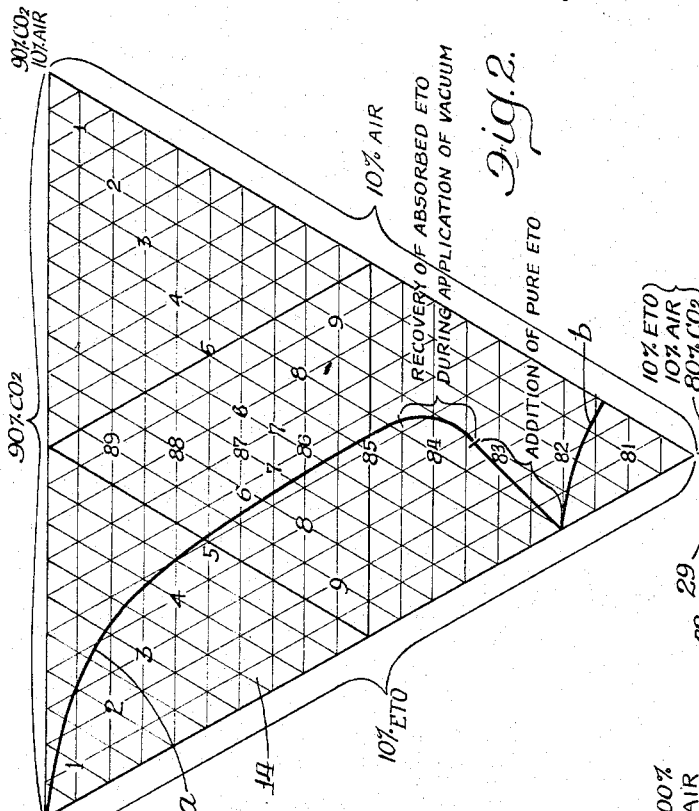
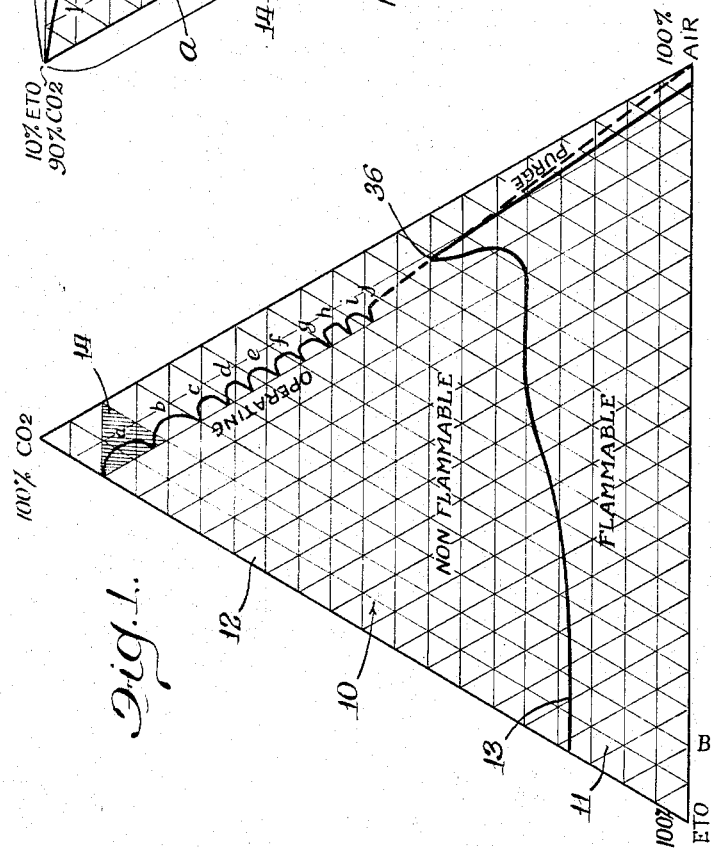
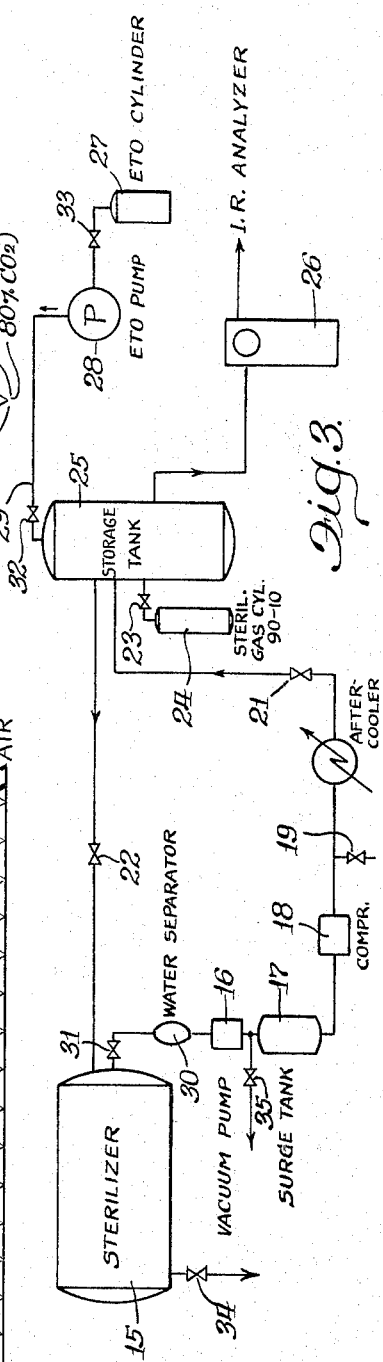
INVENTOR.
Donatas Satas
BY James I. Fawcett
Atty.

United States Patent Office 3,372,980
Patented Mar. 12, 1968

3,372,980
RECYCLIZATION OF ETHYLENE OXIDE
Donatas Satas, Palatine, Ill., assignor to The Kendall Company, Boston, Mass., a corporation of Massachusetts
Filed July 5, 1963, Ser. No. 293,120
10 Claims. (Cl. 21—53)

ABSTRACT OF THE DISCLOSURE

A method of sterilizing with a mixture of ethylene oxide and inert gas which allows safe and uniformly effective reuse of the sterilizing gas for a plurality of successive sterilization cycles. The gas mixture is refortified with substantially pure ethylene oxide when necessary so that the mixture contains at least 10% ethylene oxide at the start of each sterilization cycle, and the mixture is vented to the air while its composition is such that it will not pass through a flammable state when diluted with air.

---

This invention is concerned with sterilization by means of mixtures of ethylene oxide gas with inert gases particularly with carbon dioxide gas. More particularly, the invention is concerned with a method whereby the gas mixture after use may be refortified and safely reused a number of times.

Ethylene oxide gas is a sterilizing agent well known for its effectiveness in proper concentration but it has the drawback of being extremely inflammable in the presence of air. It is nevertheless used with extreme caution in its undiluted state at low pressures for some industrial sterilization purposes. The better and more widely accepted practice, however, is to use a mixture of ethylene oxide and some other inert gas, usually carbon dioxide, which mixture is substantially less dangerous than ethylene oxide alone and may be completely safe. A mixture of 90% carbon dioxide and 10% ethylene oxide for instance will not produce a flammable mixture in any dilution with air. An 80–20 mixture is safe in most dilutions but is flammable in a narrow critical range of air dilution. Other inert gases similarly have concentrations which are completely safe or substantially so.

Ethylene oxide is consumed to a minor degree in reaction with bacteria, water vapor, alcohol and the like during any sterilization process in which it is involved. Unfortunately, the safest mixture of ethylene oxide with carbon dioxide or other inert gas, that is, the 90–10 mixture, has just sufficient ethylene oxide (ETO) concentration that sterilization can be assured regardless of the material sterilized under normal conditions for ethylene oxide sterilization (27–30 pounds pressure in a matter of two hours at 155° F.). It has been the practice, therefore, in the interest of safety and uniformity, to use the 90–10 mixture but because its ethylene oxide content has been reduced below a safe sterilization level to vent the mixture after each cycle and use fresh mixture for each load.

Some commercial sterilizations are effected starting with an 80–20 mixture and with such a mixture it is advantageous to reuse the mixture until the ethylene oxide content falls below 10%. In normal sterilization procedures, this would permit the gas mixture to be used about three times before venting. This procedure, while it has the disadvantage of being non-uniform, is actually safer than venting the 80–20 mixture after a single use because the reuse reduces the ethylene oxide content to the point at which it may be vented safely without passing through a flammable dilution.

It is an object of this invention to provide a method whereby a 90–10 mixture of inert gas and ethylene oxide gas may be refortified so that its sterilizing powers remain substantially constant and uniform for a number of cycles and such that at the end of the recyclization the mixture may be vented to the air without possibility of passing through a flammable dilution.

It is a further object of the invention to provide a method whereby mixtures of ethylene oxide initially in percentages greater than 10% but not more than 50% with inert gas may be refortified when the ethylene oxide content is reduced by sterilization to below 10% so that they may be effective for further sterilization cycles and at the end of which the mixture may be vented to the air without possibility of passing through a flammable dilution.

Referring to the drawings:

FIGURE 1 is a ternary diagram illustrating typical flammable mixtures and a typical mixture and its refortification and recyclization as used in the practice of this invention.

FIGURE 2 is a magnified illustration of the shaded portion of FIGURE 1.

FIGURE 3 is a schematic illustration of a typical sterilization system in accordance with the invention.

The objects of the invention may be attained by analyzing the sterilization mixture after each cycle, adding sufficient pure ETO, if necessary, so that the ethylene oxide content of the sterilizing mixture is at least 10% at the start of each cycle and venting the mixture before the concentration of air in the mixture becomes greater than 50%.

Referring once more to the drawings:

In FIGURE 1, the ternary diagram 10 covering all of the mixtures of $CO_2$ (carbon dioxide), ETO (ethylene oxide) and air is divided into two areas, a flammable area 11 and a non-flammable area 12, separated by the line 13. In the non-flammable portion of the diagram, a typical series of cycles a, b, c, d, e, f, g, h, i, and j are illustrated. As is indicated in this diagram a straight line from the end of the last cycle (which line represents the various mixtures which occur as the mixture of the last cycle is vented to the air) does not pass through the flammable area.

FIGURE 2 is a magnified illustration of the shaded portion 14 of FIGURE 1. As will be noted, during the cycle a, the ethylene oxide is utilized more rapidly during the first part of the two-hour sterilization cycle. There is apparently a percentage of ethylene oxide which is preferentially absorbed and this is recovered during the application of vacuum. After the deficiency of ethylene oxide is determined, pure ETO is added as indicated to bring the percentage back to 10%.

FIGURE 3 is a diagrammatic illustration of a typical sterilization system in accordance with the invention. In a sterilizing system in which the sterilizer 15 has a volume of approximately 200 cubic feet, the following procedure is typical:

(1) The sterilizer jacket is heated to 155° F. and maintained at that temperature.

(2) A load to substantially fill the sterilizer is placed inside and the sterilizer is closed.

(3) A vacuum (25–26 inches of mercury) is pulled through open valves 31 and 22 using the pump 16 and venting through valve 35. The valves 19, 21, 23, 32, 33 and 34 are closed. Valve 22 is then closed.

(4) Steam is introduced into the sterilizer until the vacuum drops to 22–23 inches of mercury. The vacuum pump is then used to draw a vacuum of 24–25 inches of mercury.

(5) The vacuum pump is stopped, the vent valve 35 and valves 21, 31, 32 and 33 are closed. Valves 22 and 23 are then opened permitting 90–10 gas from the cylinder 24 to build up a pressure of about 27–30 pounds per square inch gauge in the sterilizer and storage tank. Valves 23 and 22 are then closed. The load is left to sterilize (two hours).

(6) Valves 21 and 31 are opened while the other valves are closed. The gas is pumped from the sterilizer into the storage tank using the vacuum pump and compressor 18 connected through the surge tank 17 until a vacuum of 25–26 inches of mercury is obtained in the sterilizer. The moisture is separated from the mixture by the water separator 30. (In the typical system illustrated, the pressure in the tank rose to 175 pounds gauge.)

(7) Valves 21 and 22 are closed and air is bled into sterilizer through valve 34 until atmospheric pressure is attained.

(8) Sterilizer is unloaded.

(9) Loss of ethylene oxide gas is determined by analysis of storage tank gas using infrared analyzer 26.

(10) Liquid ethylene oxide is added to storage tank using pump 28 connected to cylinder 27 and moving it through valves 32 and 33 and a ⅛ inch internal diameter steel tubing 29 and a fine nozzle into storage tank until ETO concentration shown by analyzer is 10%.

(11) Repeat steps 2 to 10 for several cycles (approximately 10) until air concentration is just short of 45%, but omitting opening valves 23 on step 5 and valve 22 on step 3.

(12) Close sterilizer and open valves 31, 19, 21 and 22 while other valves remain closed until atmospheric pressure is attained on the system. Close valves 21 and 19 and open 35. Draw vacuum of 25–26 inches of mercury on sterilizer and storage tank, venting the contents. Close valve 22 and open valve 34 and bleed air into sterilizer until atmospheric pressure is attained then open sterilizer.

(13) Repeat original steps 2–12.

While it is preferred to use a 90–10 mixture of carbon dioxide and ethylene oxide because then every load is exposed to the same percentage of ethylene oxide for the same period, it is obvious that one might prefer to start with an 80–20 mixture or even a mixture as rich as 50–50 and withhold any additional ethylene oxide until the percentage of ETO falls below 10% at which time the percentage could be brought up to 10% for each succeeding load. It may be possible to reduce the time of the first loads somewhat using an 80–20 or richer mixture since a higher concentration of ethylene oxide will shorten the time necessary for sterilization. However, the time gained by such procedure will not change the average time per cycle appreciably and it seems preferable to standardize on the sterilization period to avoid mistakes. While the preferred inert gas used in the method of this invention is carbon dioxide, other excellent gases for the purpose are nitrogen, trichlorofluoromethane and dichlorodifluoromethane. The invention is by no means limited to these, however, since inert gases generally are suitable and may be substituted for carbon dioxide without modifying the percentages of ethylene oxide.

It is to be understood that the safest mixture of sterilizing gas is 90% inert gas and 10% ethylene oxide gas but that mixtures richer than 10% and up to 50% of ethylene oxide may be used with substantial safety provided the concentration at the time of venting when diluted with air is not flammable. In practical terms this means that at the time of venting the concentration as represented on a ternary diagram such as FIGURE 1 must lie to the right of a line from the 100% air corner through the very tip 36 of the curve 13.

I claim:

1. A method of sterilizing successive loads to be sterilized with ethylene oxide gas comprising using a nonflammable gas mixture containing an inert gas and at least 10% and not more than 50% ethylene oxide gas, sterilizing said loads in succession, reusing said mixture for a number of sterilization cycles greater than that which would ordinarily reduce the concentration of ethylene oxide in said mixture below 10% and refortifying said mixture by the addition of substantially pure ethylene oxide as necessary so that the concentration of ethylene oxide initially present in sterilizing each load is at least 10%, said mixture acquiring a small amount of air during each sterilization cycle for which it is used, and terminating use of said mixture in sterilizing said loads by venting while the composition of said mixture is such that it will not pass through a flammable dilution with air when so vented.

2. The method of claim 1 wherein the inert gas is selected from the group consisting of carbon dioxide, nitrogen, trichlorofluoromethane and dichlorodifluoromethane.

3. The method of claim 1 wherein the mixture is reused without refortification with ethylene oxide until the concentration of ethylene oxide therein is reduced below 10% and is thereafter refortified prior to sterilizing each succeeding load by the addition of substantially pure ethylene oxide so as to bring the ethylene oxide concentration of the mixture to 10%.

4. The method of claim 1 wherein the concentration of ethylene oxide initially present in the mixture prior to sterilizing the first load is not more than 20%.

5. The method of claim 1 wherein the concentration of ethylene oxide initially present in the mixture prior to sterilizing the first load is 10%.

6. The method of claim 1 wherein the inert gas is carbon dioxide and the mixture is vented while the composition thereof, as represented by a point on the ternary diagram of FIGURE 1, is such that a straight line between said point and the 100% air corner of said diagram does not pass through the flammable area of said diagram.

7. The method of claim 1 wherein the jacket temperature of the sterilizer used is maintained between 140°–180° F. during sterilization and the time of sterilization for each load is at least 100 minutes.

8. A method of sterilizing successive loads to be sterilized with ethylene oxide gas comprising using a nonflammable gas mixture containing carbon dioxide and 10% ethylene oxide gas, sterilizing said loads in succession, reusing said mixture and refortifying it by the addition of substantially pure ethylene oxide so that the concentration of ethylene oxide initially present in the mixture sterilizing each load is approximately 10%, said mixture acquiring a small amount of air during each sterilization cycle for which it is used, said refortification with ethylene oxide and said acquisition of air resulting in the mixture used for each successive load being characterized by a constant initial proportion of ethylene oxide, a decreasing proportion of carbon dioxide and an increasing proportion of air, and terminating use of said mixture in sterilizing said loads by venting while the composition of said mixture, as represented by a point on the ternary diagram of FIGURE 1, is such that a straight line between said point and the 100% air corner of said diagram does not pass through the flammable area of said diagram.

9. A method of sterilizing successive loads to be sterilized with ethylene oxide gas comprising enclosing each successive load to be sterilized within a sterilization chamber, partially vacuumizing said sterilization chamber, admitting to said sterilization chamber to become admixed with the residual air remaining therein a nonflammable gas mixture containing an inert gas and at least 10% and not more than 50% ethylene oxide gas, sterilizing said load with said mixture, removing said mixture from said sterilization chamber to an enclosed storage chamber, bleeding air into said sterilization chamber until atmospheric pressure is reached therein, and removing the sterilized load from said sterilization chamber, said mixture being reused for a number of sterilization cycles greater than that which would ordinarily reduce the concentration of ethylene oxide in said mixture below 10% and being refortified in said storage chamber by the addition of substantially pure ethylene oxide as necessary so that the concentration of ethylene oxide present in sterilizing each load is at least 10%, the use of said mixture in sterilizing said loads being terminated by venting while the composition of said mixture is such that it will not pass through a flammable dilution with air when so vented.

10. The method of claim 9 wherein the inert gas is carbon dioxide and the mixture is vented while the composition thereof, as represented by a point on the ternary diagram of FIGURE 1, is such that a straight line between said point and the 100% air corner of said diagram does not pass through the flammable area of said diagram.

References Cited

UNITED STATES PATENTS

| | | | |
|---|---|---|---|
| 2,080,179 | 5/1937 | Merriam et al. | 21—58 |
| 2,119,837 | 6/1938 | Wehrle | 21—58 |
| 2,131,134 | 9/1938 | Baer et al. | 21—58 |
| 3,068,064 | 12/1962 | McDonald | 21—58 |

FOREIGN PATENTS 459,721  1/1937  Great Britain.

MORRIS O. WOLK, *Primary Examiner.*

J. ZATARGA, *Assistant Examiner.*